US011248614B2

(12) United States Patent
Lyons

(10) Patent No.: US 11,248,614 B2
(45) Date of Patent: Feb. 15, 2022

(54) FAN APPARATUS

(71) Applicant: SKINNERS DESIGN LIMITED, Epsom (GB)

(72) Inventor: Ian Lyons, Epsom (GB)

(73) Assignee: Skinners Design Limited, Epsom (GB)

( * ) Notice: Subject to any disclaimer, the term of this patent is extended or adjusted under 35 U.S.C. 154(b) by 120 days.

(21) Appl. No.: 16/302,384

(22) PCT Filed: May 19, 2017

(86) PCT No.: PCT/EP2017/062060
§ 371 (c)(1),
(2) Date: Nov. 16, 2018

(87) PCT Pub. No.: WO2017/198801
PCT Pub. Date: Nov. 23, 2017

(65) Prior Publication Data
US 2019/0293075 A1    Sep. 26, 2019

(30) Foreign Application Priority Data

May 20, 2016  (GB) ...................................... 1608914

(51) Int. Cl.
*F04D 19/00*   (2006.01)
*F04D 17/16*   (2006.01)
(Continued)

(52) U.S. Cl.
CPC ........... *F04D 19/002* (2013.01); *F04D 17/16* (2013.01); *F04D 19/005* (2013.01);
(Continued)

(58) Field of Classification Search
CPC .... F04D 19/002; F04D 19/005; F04D 19/007; F04D 19/046; F04D 17/08; F04D 17/12;
(Continued)

(56) References Cited

U.S. PATENT DOCUMENTS 1,520,554 A * 12/1924 Ankeny ................... E03D 9/052
4/214
2,603,797 A * 7/1952 Baither .................... E03D 9/052
4/214
(Continued)

FOREIGN PATENT DOCUMENTS

EP    0 878 673    11/1998
FR    2 279 033    2/1976
(Continued)

OTHER PUBLICATIONS

PCT Written Opinion of the International Searching Authority for International Application No. PCT/EP2017/062060 dated Nov. 23, 2017.

*Primary Examiner* — Richard A Edgar
*Assistant Examiner* — Aye S Htay
(74) *Attorney, Agent, or Firm* — King & Partners, PLC

(57) ABSTRACT

The present disclosure relates to a fan apparatus (1). The fan apparatus (1) includes an impeller (12A, 12B, 12C, 26A, 26B) for generating a flow of air. A drive means (14) is provided for driving the impeller (12A, 12B, 12C, 26A, 26B). At least in certain embodiments, the drive means (4) includes a turbine (18) adapted to be rotated by a working liquid supplied to the fan apparatus (1). The fan apparatus (1) described herein is suitable for providing air ventilation and/or air extraction, for example.

20 Claims, 8 Drawing Sheets

Side Cross Section Elevation

(51) Int. Cl.
*F04D 25/02* (2006.01)
*F04D 25/04* (2006.01)
*F04D 25/10* (2006.01)
*F04D 25/12* (2006.01)
*F04D 27/00* (2006.01)
*F04D 29/60* (2006.01)
*F04D 25/16* (2006.01)
*F04D 25/08* (2006.01)

(52) U.S. Cl.
CPC ........... *F04D 19/007* (2013.01); *F04D 25/02* (2013.01); *F04D 25/024* (2013.01); *F04D 25/04* (2013.01); *F04D 25/045* (2013.01); *F04D 25/08* (2013.01); *F04D 25/10* (2013.01); *F04D 25/105* (2013.01); *F04D 25/12* (2013.01); *F04D 25/16* (2013.01); *F04D 25/166* (2013.01); *F04D 27/004* (2013.01); *F04D 29/601* (2013.01)

(58) Field of Classification Search
CPC ........ F04D 17/127; F04D 17/14; F04D 19/02; F04D 19/022; F04D 19/024; F04D 19/026; F04D 19/028; F04D 25/045; F04D 25/105; F04D 25/12; F04D 27/004; F24F 7/00; F24F 2007/001; F24F 2007/002
See application file for complete search history.

(56) References Cited

U.S. PATENT DOCUMENTS

| | | | | |
|---|---|---|---|---|
| 4,283,915 A | * | 8/1981 | McConnell | F03G 7/04 60/650 |
| 5,044,018 A | * | 9/1991 | Gandini | E03D 9/052 4/216 |
| 5,249,923 A | * | 10/1993 | Negus | F03B 3/00 239/70 |
| 5,257,421 A | * | 11/1993 | Rose | E03D 9/052 4/209 R |
| 6,279,173 B1 | * | 8/2001 | Denzin | E03D 9/05 4/213 |
| 6,526,598 B1 | * | 3/2003 | Black | E03D 9/052 4/214 |
| 6,553,584 B1 | * | 4/2003 | Elnar | F04D 25/04 4/541.1 |
| 2008/0210205 A1 | * | 9/2008 | Baek | F02B 35/02 123/565 |
| 2014/0314559 A1 | * | 10/2014 | Khalitov | F04D 19/002 415/208.1 |
| 2015/0192030 A1 | * | 7/2015 | Rubinshtein | F01D 15/10 290/52 |
| 2016/0102876 A1 | * | 4/2016 | Teoh | F24F 13/26 454/250 |
| 2018/0142619 A1 | * | 5/2018 | Su | F02C 3/067 |
| 2018/0291925 A1 | * | 10/2018 | Chrabascz | B64D 13/06 |

FOREIGN PATENT DOCUMENTS

| | | |
|---|---|---|
| GB | 1208797 | 10/1970 |
| JP | 2006-77751 | 3/2006 |
| WO | WO 1994/13893 | 6/1994 |
| WO | WO 2007/007973 | 1/2007 |

* cited by examiner

Side Cross Section Elevation

End Elevation

FAN APPARATUS

CROSS-REFERENCE TO RELATED APPLICATION(S)

This application is a § 371 national phase of International Application Number PCT/EP2017/062060, filed on May 19, 2017, which claims the benefit of Great Britain Patent Application Number 1608914.6, filed on May 20, 2016—all of which are hereby incorporated herein by reference in their entirety, including all references cited therein.

TECHNICAL FIELD

The present disclosure relates to a fan apparatus. More particularly, but not exclusively, the present disclosure relates to a fan apparatus for providing air ventilation and/or air extraction.

BACKGROUND

It is well known to install fans in residential and commercial buildings to provide air ventilation and/or air extraction. The fan is typically permanently installed in an aperture formed in a building wall. The fan may be operable to generate a flow of air into the building to provide ventilation; and/or to generate a flow of air out of the building to extract air. However, known fans can be noisy and/or expensive to run, particularly if left on for extended periods of time. If the fan develops a fault or is incorrectly installed, it is often necessary to install a replacement unit which incurs additional expense, particularly if an electrician is needed to make the installation.

It is against this backdrop that the present invention has been conceived. At least in certain embodiments, the present invention seeks to overcome or ameliorate at least some of the shortcomings of prior art systems.

SUMMARY OF THE INVENTION

Aspects of the present invention relate to a fan apparatus as claimed in the appended claims.

According to a further aspect of the present invention there is provided a fan apparatus comprising:
an impeller for generating a flow of air; and
a drive means for driving the impeller;
wherein the drive means comprises a turbine adapted to be rotated by a working liquid supplied to the fan apparatus. The impeller is mechanically coupled to the drive means. In use, the turbine is rotated by the working liquid and causes the impeller to rotate, thereby generating the flow of air. By using a working liquid, at least in certain embodiments the fan apparatus can be installed without an electrical connection. This can offer safety benefits over fans which are driven by one or more electrical motors. It will be understood that the fan apparatus may operate without an electricity supply. Thus, the fan apparatus may be fitted in extreme wet/damp conditions. It is believed that the running costs of the fan apparatus may be reduced compared to prior art systems.

The fan apparatus can be configured to start automatically with movement of the working liquid.

The impeller and/or the drive means may be incorporated into a removable cartridge. The cartridge may comprise quick release inlet and outlet connectors for connecting the drive means to the water supply. At least in certain embodiments, the removable cartridge would facilitate maintenance and/or repair. The removable cartridge could be interchangeable, for example to allow a more powerful drive means to be installed to suit particular conditions without the need to replace the entire fan apparatus. At least in certain embodiments the cartridge could be replaced without specialist training, for example by an end customer.

The impeller may be disposed in a duct having an air inlet and an air outlet. The impeller can generate the flow of air along said duct.

The impeller could be a radial impeller, for example a centrifugal fan. Alternatively, the impeller may be an axial impeller.

The fan apparatus may comprise a supply conduit for supplying working liquid to the turbine. The supply conduit may be configured to be connected to a water supply. The water supply can supply water as the working liquid. The water supply may form part of a domestic water supply, for example comprising a hot water system and/or a cold water system. The supply conduit may comprise an inlet and an outlet for connection in series to said water supply. The turbine may be disposed between the inlet and the outlet of the supply conduit.

The supply conduit may be configured to be connected to a mains water supply.

The fan apparatus may be configured to be connected to a pressurised water supply (either hot or cold). The fan apparatus may, for example, be configured to be connected to a water supply having an operating pressure greater than or equal to (≥)1 bar, 1.5 bar, 2 bar, 2.5 bar, 3 bar or 3.5 bar. These operating conditions are applicable to each of the embodiments of the fan apparatus described herein.

The fan apparatus may be configured to be connected to a water supply having a flow rate of greater than or equal to (≥)0.25 litres/sec, 0.5 litres/sec, 0.75 litres/sec, 1 litres/sec, 1.25 litres/sec or 1.5 litres/sec. These operating conditions are applicable to each of the embodiments of the fan apparatus described herein.

The fan apparatus may comprise a heating element. The heating element may be disposed upstream or downstream of the impeller. The heating element may be suitable for heating the air. The heating element may comprise one or more heat exchange fins for heating the flow of air. The heating element may be thermally coupled to a hot water conduit for connection to a hot water supply. The hot water conduit may be configured to be connected to a hot water loop. The hot water loop may be heated by a water heater or a boiler. A pump may be provided for circulating the hot water within the hot water loop. The pump may be operated to circulate water in order to operate the fan apparatus even when the water heater or boiler is not activated. Thus, the fan apparatus may be operated independently of the water heater or boiler.

The fan apparatus may comprise one or more energy storage means for storing energy supplied by the working liquid and for rotating the impeller when the supply of working liquid decreases or stops. The one or more energy storage means may comprise spring means. The spring means may comprise one or more spring elements, for example a coil spring, a tension spring or a compression spring. The one or more spring elements may form one or more constant force springs.

The energy storage means may be configured to vary a rotational speed of the impeller. The energy storage means may, for example, cause the rotational speed of the impeller to increase and decrease cyclically. Thus, the energy storage means may cause fluctuations or pulses in the rotational speed of the impeller.

The fan apparatus may comprise one or more decoupling means for decoupling the drive means. The one or more decoupling means may be configured to decouple the drive means when the energy storage means reaches a predetermined charge state. For example, the one or more decoupling means may decouple the drive means when the energy storage means is fully charged.

The one or more decoupling means may be connected to a supply valve for controlling the supply of working liquid to the drive means. The supply valve may, for example, be closed when the one or more decoupling means opens to decouple the drive means.

The fan apparatus may comprise means for selectively coupling the energy storage means to the impeller. The coupling means may comprise one or more drive shafts and/or a gear train.

The impeller may be a bidirectional impeller operable selectively to generate a flow of air in first and second directions which are opposite to each other. The drive means may be operable to drive the impeller in either said first direction or said second direction. A control valve may be provided to control the supply of working liquid to the fan apparatus to determine the rotational direction of the impeller. Alternatively, or in addition, the fan apparatus may comprise one or more unidirectional impellers.

The impeller may be a first impeller for generating a first flow of air in a first direction. The fan apparatus may comprise a second impeller for generating a second flow of air in a second direction. The first and second directions may be opposite to each other. The first impeller may be one of an exhaust impeller and an intake impeller; and the second impeller may be the other of said exhaust impeller and the intake impeller. The drive means may be configured to drive said first and second impellers. For example, the rotational direction of the drive means could determine which of the first and second impellers is driven. Alternatively, the drive means may be a first drive means and the fan apparatus may comprise a second drive means for driving the second impeller, wherein the second drive means comprises a second turbine adapted to be rotated by a working liquid supplied to the fan apparatus.

The first and second impellers may be arranged concentrically. For example, one of said first and second impellers may have an annular configuration and the other of said first and second impellers may have a circulate configuration.

The fan apparatus may be an extractor fan and/or a ventilation fan.

The impeller and the drive means may be disposed in a removable cartridge. The removable cartridge may be configured to be mounted in a sleeve or other casing. The fan apparatus may comprise releasable connectors for connecting the drive means to a working liquid supply. The releasable connectors may be quick-release connectors, for example. In those arrangements in which the fan apparatus comprises a second drive means and a second impeller, the second drive means and the second impeller may also be disposed in the removable cartridge.

According to a further aspect of the present invention there is provided a fan apparatus comprising:
  a first impeller for generating a flow of air in a first direction; and
  a second impeller for generating a flow of air in a second direction;
  wherein the first and second impellers are arranged concentrically, and the first and second directions are substantially opposite to each other.

The first impeller may have a circular profile, and the second impeller may have an annular profile.

The first and second impellers may have the same rotational direction. Alternatively, the first and second impellers may have opposite rotational directions.

The first and second impellers may be operable independently of each other.

The fan apparatus may comprise first and second drive means for driving said first and second impellers respectively. The first drive means may comprise a first turbine for rotation by a working liquid; and/or the second drive means may comprise a second turbine for rotation by a working liquid.

The fan apparatus may comprise an energy storage means for storing energy supplied by the working liquid and for rotating the impeller when the supply of working liquid decreases or stops. The energy storage means may comprise spring means. The spring means may comprise one or more spring elements, for example a coil spring, a tension spring or a compression spring. The one or more spring elements may form one or more constant force springs.

The energy storage means may be configured to vary a rotational speed of the first impeller and/or the second impeller.

The fan apparatus may comprise decoupling means for decoupling the first drive means and/or the second drive means, for example when the energy storage means reaches a predetermined charge state. For example, the first decoupling means and/or the second decoupling means may decouple the first and second drive means respectively when the energy storage means is fully charged. The first decoupling means and/or the second decoupling means may be connected to one or more supply valves for controlling the supply of working liquid to the first drive means and the second drive means respectively. The one or more supply valves may, for example, be configured to close when the first decoupling means and/or the second decoupling means is/are open to decouple the respective drive means.

The fan apparatus may be configured to be connected to a pressurised water supply (either hot or cold). The fan apparatus may, for example, be configured to be connected to a water supply having an operating pressure greater than or equal to ($\geq$)1 bar, 1.5 bar, 2 bar, 2.5 bar, 3 bar or 3.5 bar. These operating conditions are applicable to each of the embodiments of the fan apparatus described herein.

The fan apparatus may be configured to be connected to a water supply having a flow rate of greater than or equal to ($\geq$)0.25 litres/sec, 0.5 litres/sec, 0.75 litres/sec, 1 litres/sec, 1.25 litres/sec or 1.5 litres/sec. These operating conditions are applicable to each of the embodiments of the fan apparatus described herein.

According to a further aspect of the present invention there is provided a fan apparatus comprising:
  an impeller for generating a flow of air; and
  a drive means for driving said impeller;
  wherein the drive means is configured cyclically to vary a rotational speed of the impeller. The drive means may be configured cyclically to increase and decrease the rotational speed of the impeller. The rotational speed of the impeller may increase and decrease with respect to time. The rotational speed of the impeller may be pulsed.

The variations in the rotational speed of the impeller may vary a flow rate through the fan apparatus. Thus, the generated flow rate through the fan apparatus is non-uniform.

The drive means may comprise a spring member, for example a torsion spring or a constant force spring.

Alternatively, or in addition, the drive means may comprise a turbine for driving the impeller. In use, a working liquid may be supplied to the fan apparatus to drive the impeller. A drive means control valve may be cyclically opened and closed (either partially or fully) to induce variations in the rotational speed of the impeller.

Alternatively, or in addition, the drive means may comprise an electric motor for driving said impeller. An electronic control unit may be provided to vary the rotational speed of the electric motor to vary the rotational speed of the impeller.

The impeller may be a first impeller. The first impeller may be an exhaust impeller. The variations in the rotational speed of the first impeller may vary a first flow rate through the fan apparatus. For example, the flow rate through an exhaust duct may vary as a result of the variations in the rotational speed of the first impeller.

The fan apparatus may comprise a second impeller. The second impeller may be an intake impeller. The drive means may be suitable for driving said second impeller. The drive means may be configured cyclically to vary a rotational speed of the second impeller. The rotational speed of the second impeller may increase and decrease with respect to time. The rotational speed of the second impeller may be pulsed. The drive means may be configured such that the variations in the rotational speed of the first and second impellers are out of phase with each other. For example, the variations in the rotational speed of the first and second impellers may, for example, be out of phase by ±45°, ±90° or ±180°.

The variations in the rotational speed of the second impeller may vary a second flow rate through the fan apparatus. For example, the flow rate through an intake duct may vary as a result of the variations in the rotational speed of the second impeller.

The fan apparatus may be configured such that the first and second impellers operate simultaneously to generate flows of air through respective first and second ducts. The flow rates through the first and second ducts may vary relative to each other. The flow rates through each of the first and second ducts may vary cyclically. The variations in the first and second flow rates may be synchronised with each other. Alternatively, the variations in the first and second flow rates may be out of phase with each other.

It is believed that this control strategy is patentable independently of the other concept(s) described herein. The control strategy may be applied to the fan apparatus described herein comprising a drive means which is supplied by a working liquid. Alternatively, the control strategy may be applied to a fan apparatus having one or more electric machines for driving one or more impellers. The one or more electric machines may be controlled by an electronic controller having an electronic processor.

According to a further aspect of the present invention there is provided a fan apparatus comprising:
 an impeller for generating a flow of air;
 a drive means for driving the impeller; and
 a mounting sleeve;
 wherein the impeller and the drive means are disposed in a cartridge for mounting in said mounting sleeve. There may be more than one type of cartridge available for mounting in the mounting sleeve. In certain embodiments, different cartridges for mounting in the mounting sleeve may have different drive means. For example, a first cartridge may comprise a turbine which is operatively driven by a working liquid to drive the impeller; and a second cartridge may comprise an electric motor for driving the impeller. Alternatively, or in addition, different cartridges may have different power ratings, for example different sizes of electric motors. Alternatively, or in addition, different cartridges may have different impeller configurations. A first cartridge may have only one impeller for generating a flow or air in a one direction; and a second cartridge may have two impellers for generating flows of air in first and second directions. The orientation of the cartridge in said mounting sleeve may be reversible, for example to enable installation as either an intake fan or a ventilation fan.

The cartridge may be suitable for mounting removably in said mounting sleeve. The removable mounting of the cartridge may facilitate maintenance or repair, for example.

The cartridge may comprise one or more connectors for connecting the drive means to a power supply. The drive means may comprise a turbine for driving the impeller. Alternatively, or in addition, the drive means may comprise an electric motor.

The fan apparatus may comprise one or more mechanical fasteners for mounting the cartridge in the sleeve.

According to a further aspect of the present invention there is provided a kit comprising the mounting sleeve and the cartridge described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
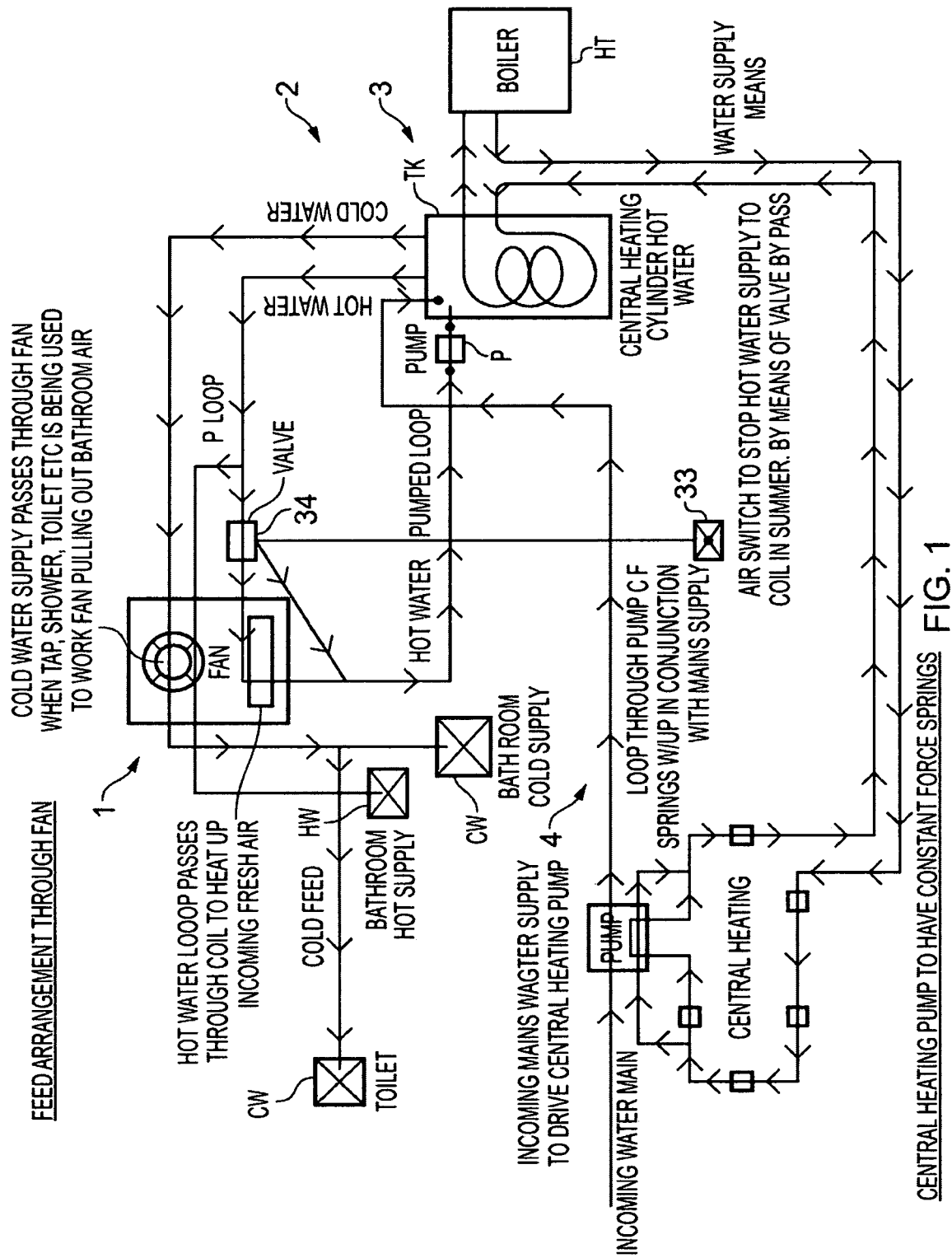
FIG. 1 shows a schematic representation of a water supply system incorporating a fan apparatus in accordance with an embodiment of the present invention.

A fan apparatus 1 in accordance with an embodiment of the present invention will now be described with reference to FIGS. 1 to 4. The fan apparatus 1 is configured to be supplied with a working liquid which drives the fan apparatus 1.

The fan apparatus 1 is configured to be mounted in a wall of a building to control the flow of air into and out of a room. The fan apparatus 1 in accordance with the present embodiment is operable to introduce air into the room to provide ventilation and to extract air from the room. Thus, the fan apparatus 1 is operable both as a ventilation fan and as an extractor fan. The fan apparatus 1 has particular application as a bathroom fan or a washroom fan, but it will be understood that the present invention is not limited in this respect. In the present embodiment the fan apparatus 1 is connected to a water supply system (denoted generally by the reference numeral 2 in FIG. 1) comprising a hot water system 3 and a cold water system 4. The hot water system 3 comprises a water heater HT, such as a boiler, fluidly connected to a hot water tank TK. A pump P is provided for circulating the hot water through the hot water system 3. The cold water system 4 is connected to a mains water supply MN. The hot water system 3 is configured to supply hot water to a hot water outlet HW, such as a bath, a basin or a shower. The cold water system 4 is configured to supply cold water to a cold water outlet CW, such as a bath, a basin, a shower or a toilet.

Figure 2:
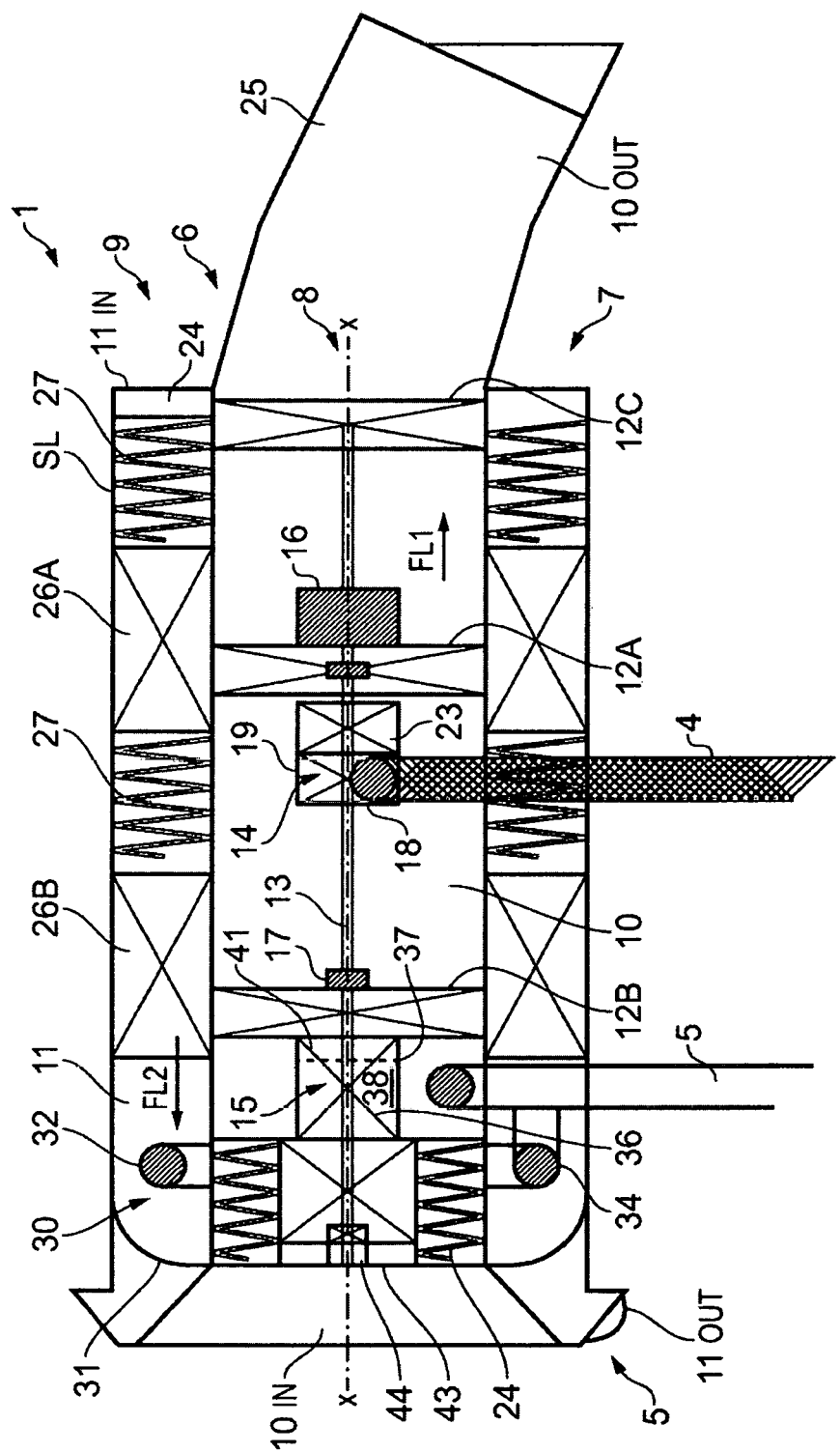
FIG. 2 shows a schematic representation of the fan apparatus incorporated into the water supply system of FIG. 1.
Figure 3:
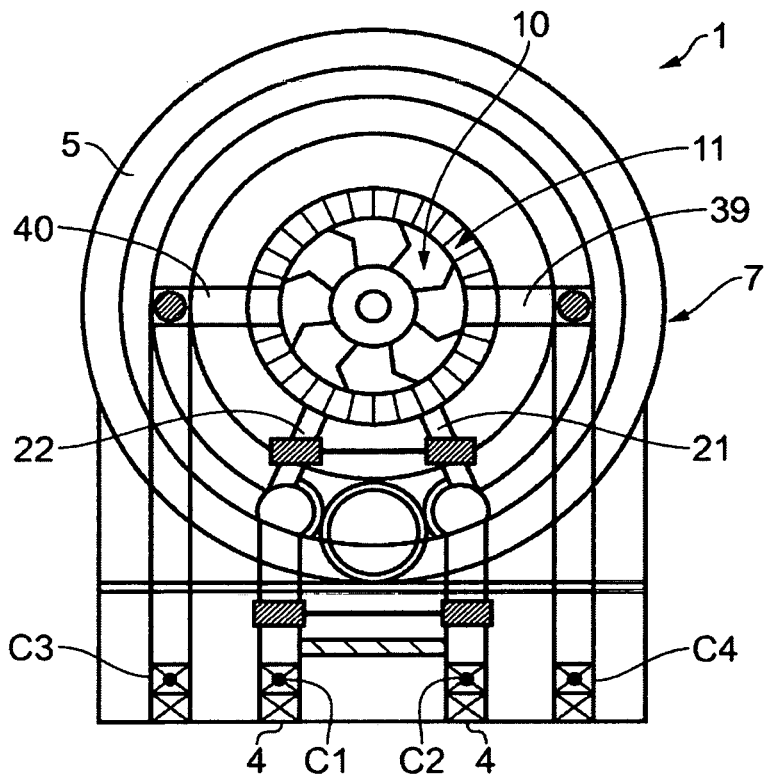
FIG. 3 is a front elevation of the fan apparatus shown in FIG. 2.
Figure 4:
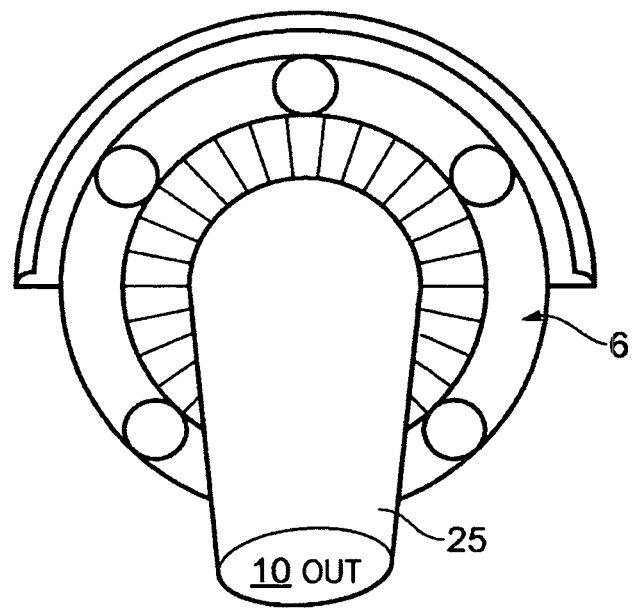
FIG. 4 is a rear elevation of the fan apparatus shown in FIG. 2.

With reference to FIG. 2, the fan apparatus 1 has an inner face plate 5 and an outer face plate 6. The inner face plate 5 is configured for mounting internally, for example to an internal wall of the building; and the outer face plate 6 is configured for mounting externally, for example to an external wall of the building. The fan apparatus 1 comprises a cartridge 7 which is removably mounted in a mounting sleeve SL fixedly mounted in an aperture formed in the building wall. As shown in FIG. 3, the cartridge 7 comprises first and second releasable connectors C1, C2 for connecting the fan apparatus 1 to the hot water system 3; and third and fourth connectors C3, C4 for connecting the fan apparatus 1 to the cold water system 4.

The fan apparatus 1 comprises an exhaust fan 8 for extracting air from a room; and an intake fan 9 for drawing air into the room. The exhaust fan 8 and the intake fan 9 can be operated independently of each other. In the present embodiment, the exhaust fan 8 and the intake fan 9 can be operated simultaneously to provide dual function operation, i.e. to provide simultaneous ventilation and extraction. Alternatively, or in addition, the fan apparatus 1 can be configured such that either the exhaust fan 8 or the intake fan 9 operates at any time, i.e. to provide either ventilation or extraction. The exhaust fan 8 and the intake fan 9 are both disposed in the cartridge 7.

The exhaust fan 8 is associated with an exhaust duct 10 having an exhaust inlet 10IN and an exhaust outlet 10OUT. The intake fan 9 is associated with an intake duct 11 having an intake inlet 11IN and an intake outlet 11OUT. The intake duct 11 has an annular section and extends at least partially around an exterior of the exhaust duct 10. In the present embodiment, the exhaust duct 10 and the intake duct 11 are arranged concentrically. In alternate embodiments, the fan apparatus 1 may comprise one or more cylindrical intake ducts radially offset from the intake duct 11. The exhaust fan 8 is configured to generate a first flow of air FL1 through the exhaust duct 10 (drawing air in through the exhaust inlet 10IN and expelling it through the exhaust outlet 10OUT). The intake fan 9 is configured to generate a second flow of air FL2 through the intake duct 11 (drawing air in through the intake inlet 11IN and expelling it through the intake outlet 11OUT). The first and second flows of air FL1, FL2 are in opposite directions substantially parallel to a longitudinal axis X of the fan apparatus 1. Exhaust guide means are optionally provided at the exhaust outlet 10OUT to re-direct the first flow of air FL1. In the present embodiment, the exhaust guide means comprises a directional nozzle 25 mounted to the outer face plate 6. Intake guide means are optionally provided at the intake outlet 11OUT to re-direct the second flow of air FL2. The intake guide means comprise an intake nozzle 45 formed in the inner face plate 5. The intake nozzle 45 is directed downwardly such that air is directed downwardly into the room to provide improved circulation.

The fan apparatus 1 comprises a first drive shaft (spline) 13A, a second drive shaft (spline) 13B, a first drive means 14, a second drive means 15, a first decoupling means 16 and a second decoupling means 17. The first and second drive shafts 13A, 13B are mounted on bearings and are both rotatable about a longitudinal axis X-X of the fan apparatus 1. The second decoupling means 17 is provided for selectively coupling and decoupling the first and second drive shafts 13A, 13B. The first drive shaft 13A is operatively driven by the first drive means 14.

The exhaust fan 8 has a circular profile and is configured to generate an axial flow through the exhaust duct 10. The exhaust fan 8 comprises first, second and third exhaust impellers 12A-C disposed in the exhaust duct 10. The first, second and third exhaust impellers 12A-C are each rotatable about a longitudinal axis X-X of the fan apparatus 1 in the same direction. The first, second and third exhaust impellers 12A-C each comprise a plurality of blades (not shown) configured to propel air through exhaust duct 10. The first exhaust impeller 12A is drivingly connected to the first drive shaft 13A. The second and third exhaust impellers 12B, 12C are freely rotatable relative to the first and second drive shafts 13A, 13B.

The first decoupling means 16 is provided for selectively decoupling the first exhaust impeller 12A from the first drive shaft 13A. The first decoupling means 16 may, for example, comprise a first clutch which can open to decouple the first exhaust impeller 12A from the first drive shaft 13A. The second decoupling means 17 is provided for selectively decoupling the first drive shaft 13A from the second drive shaft 13B. The second decoupling means 17 may, for example, comprise a second clutch which can open to decouple the first and second drive shafts 13A, 13B.

The first drive means 14 comprises a first turbine 18 disposed in a centrally mounted first drive housing 19. The first drive housing 19 comprises a first turbine chamber 20 having a first inlet 21 and a first outlet 22 for connection in series to the cold water system 4 of the water supply system 2. In use, cold water is supplied to the first turbine chamber 20 as a working liquid to drive the first turbine 18. The first turbine 18 is rotated by the working liquid and drives the first drive shaft 13A. A first gear set 23 is optionally connected to the first drive means 14 for increasing the rotational speed of the first drive shaft 13A, thereby increasing the rotational speed of the first exhaust impeller 12A.

The intake fan 9 is configured to generate an axial flow through the intake duct 11. The intake fan 9 comprises a first intake impeller 26A, a second intake impeller 26B, a first torque transfer means 27 and a second torque transfer means 28. An air intake valve 29 is pivotally or rotatably mounted to the cartridge 7 for opening and closing the intake inlet 11IN. In the present embodiment the first and second intake impellers 26A, 26B each have an annular section and are disposed in series in the intake duct 11. In alternate embodiments, the intake fan 9 can comprise one or more circular intake fans, for example spaced around the circumference of the exhaust fan 8. The first and second intake impellers 26A, 26B each comprise a plurality of blades (not shown) configured to draw air through the fan apparatus 1 as they rotate. The first intake impeller 26A is drivingly connected to the first exhaust impeller 12A by a first coupling mechanism (not shown). In use, the first intake impeller 26A rotates with the first exhaust impeller 12A. The second intake impeller 26B is drivingly connected to the third exhaust impeller 12C by a second coupling mechanism (not shown). The first and second intake impellers 26A, 26B both rotate in the same direction as each other, which may be the same direction as the first, second and third exhaust impellers 12A, 12B, 12C or may be the opposite direction to the first, second and third exhaust impellers 12A, 12B, 12C. In a variant, the second exhaust impeller 12B and the second intake impeller 26B could be fixedly connected to each other (or formed integrally). In this arrangement, the blades in the second exhaust impeller 12B and the second intake impeller 26B could be reversed so as to impel air in opposite directions as the second exhaust impeller 12B and the second intake impeller 26B rotate together in the same direction.

The first intake impeller 26A is connected to the second intake impeller 26B by the first torque transfer means 27. The first intake impeller 26A is connected to the third exhaust impeller 12C by the second torque transfer means 28. In the present embodiment, the first and second torque transfer means 27, 28 comprise first and second torsion springs 27, 28 respectively. At least in certain embodiments one or both of the first and second torsion springs 27, 28 may be constant force torsion springs 27, 28. The first torsion spring 27 is operative to introduce a variation in the rotational speed of the first intake impeller 26A relative to the rotational speed of the second intake impeller 26B. Since the second exhaust impeller 12B is connected to and driven by the second intake impeller 26B, the rotational speed of the second exhaust impeller 12B may also be different from that of the first exhaust impeller 12A. The second torsion spring 27 is operative to introduce a variation in the rotational speed of the first intake impeller 26A relative to the rotational speed of the third exhaust impeller 12C. When the first intake impeller 26A is rotated by the first drive means 14, the first and second torsion springs 27, 28 absorb energy before transmitting torque to the second intake impeller 26B and the third exhaust impeller 12C. The potential energy stored in the first and second torsion springs 27, 28 is periodically released, thereby changing the rotational speeds of the second and third exhaust impellers 12B, 12C and the second intake impeller 26B. For a constant supply of water to the first drive means 14, the first intake impeller 26A has a substantially constant rotational speed. However, the rotational speed of the second intake impeller 26B and the third exhaust impeller 12C may cyclically increase and decrease due to the storage and release of potential energy by the first and second torsion springs 27, 28. Thus, at least in certain embodiments the flow rate through the exhaust duct 10 and/or the intake duct 11 may be non-uniform. In the present embodiment the first and second torsion springs 27, 28 have different mechanical properties, such as stiffness; the resulting variations in the flow rates through the exhaust duct 10 and the intake duct 11 may be out of phase with each other. In alternate embodiments, the first and second torsion springs 27, 28 may have substantially the same mechanical properties, such as stiffness; the resulting variations in the flow rates through the exhaust duct 10 and the intake duct 11 may be in phase with each other.

A first energy storage means 24 is provided for storing energy to provide an overrun function. The first energy storage means 24 may, for example, comprise a first spring, such as a torsion spring. In the present embodiment, the first energy storage means 24 comprises a first constant force spring 24. The first constant force spring 24 is disposed at the front of the fan apparatus 1. The first constant force spring 24 is connected to the second drive shaft 13B and stores energy when the second drive shaft 13B is rotated by the first drive shaft 13A. The first constant force spring 24 is configured to rotate the second exhaust impeller 12B as it releases stored energy.

The fan apparatus 1 comprises a heating unit 30 for heating the flow of air through the intake duct 11. As shown in FIG. 1, the heating unit 30 is located in an annular chamber 31 disposed at the front of the fan apparatus 1. As shown in FIG. 1, the intake nozzle 45 is formed in a lower section of the annular chamber 31 and is directed downwardly. The heating unit 30 in the present embodiment comprises an annular conduit 32 which can be selectively fluidly connected to the hot water system 3. One or more heat exchange fins (not shown) may optionally be disposed in the annular chamber 31. The heat exchange fins may be thermally coupled to the annular conduit 32 to promote heat transfer. A heating control valve 34 is provided for controlling the supply of hot water to the heating unit 30. The heating control valve 34 is opened when the second intake impeller 26B is activated to supply hot water to the heating unit 30, thereby heating air as it drawn through the intake duct 11. Alternatively, or in addition, the heating control valve 34 can, for example, be controlled by a switch 33. The switch 33 can, for example, be an air (pressure) switch comprising an air conduit from the fan apparatus 1 to a switch which is operable to change the pressure in the conduit in order to actuate the heating control valve 34. The opening of the heating control valve 34 also initiates the process of winding the first constant force spring 24. As described below, when fully primed, the first constant force spring 24 may be held by a holding mechanism 44 ready to release energy when the supply of working liquid by the cold water system 4 stops.

In the present embodiment the second drive means 15 is provided at the front of the fan apparatus 1. The second drive means 15 is connected to the hot water system 3. The second drive means 15 is configured to drive the second exhaust impeller 12B when water is supplied by the hot water system 3, thereby driving the first and second intake impellers 26A, 26B. The second drive means 15 comprises a second turbine 36 disposed in a second drive housing 37. The second drive housing 37 comprises a second turbine chamber 38 having a second inlet 39 and a second outlet 40 for connection in series to the hot water system 3. The second turbine 36 is configured to rotate the second drive shaft 13B to drive the second exhaust impeller 12B. The second drive means 15 may comprise a second gear set 41 for increasing the rotational speed of the second exhaust impeller 12B. In use, hot water is supplied to the second turbine chamber 38 as a working liquid and drives the second turbine 36. The hot water is supplied to the second turbine chamber 38 when the hot water outlet HW is opened. The hot water outlet HW typically comprises a hot water supply valve, for example provided in a hot water tap or a shower control. A second drive means control valve 35 may optionally be provided to control the supply of hot water to the second turbine 36 from the hot water system 3. The second drive means control valve 35 may be configured to open and close repeatedly as the first constant force spring 24 drives the second drive shaft 13B. The second turbine 36 may thereby delivers a non-constant driving force to the second drive shaft 13B, resulting in variations in the rotational speed of the second exhaust impeller 12B and the first and second intake impellers 26A, 26B. The second drive means control valve 35 may thereby promote a non-uniform flow rate of air through the exhaust duct 10 and the intake duct 11.

The first constant force spring 24 is held in compression and torsion. The first constant force spring 24 is held in compression against a front pressure plate 43. The front pressure plate 43 travels along a thread mechanism (not shown) when the second exhaust impeller 12B rotates, thereby compressing the first constant force spring 24. The first constant force spring 24 is primed and releases energy to drive the second exhaust impeller 12B when the supply of cold water to the first drive means 14 stops. When released, the first constant force spring 24 outputs axial and rotational forces. The first constant force spring 24 thereby causes the front pressure plate 43 to travel along the second drive shaft 13B whilst also rotating the second drive shaft 13B. The second decoupling means 17 opens when the first constant force spring 24 operates, for example due to a reversal in the rotational direction of the second drive shaft 13B, to decouple the first drive means 14 from the second drive means 15. Once the energy stored in the first constant force spring 24 is depleted, the second decoupling means 17 closes. The first constant force spring 24 stores energy from the hot water supply and the procedure is repeated. The holding mechanism 44 may be provided for holding the front pressure plate 43 and the second drive means 15. The front pressure plate 43 is set into a locked position when the second drive means 15 is primed ready to be triggered by overrun on the second intake impeller 26B. The holding mechanism may, for example, comprise a ratchet and pin that will fall into place once the first constant force spring 24 is fully loaded. When the supply of working liquid from the cold water system 4 stops, the overrun and/or recoil on the second intake impeller 26B reverses the rotational direction of the second exhaust impeller 12B. The reversal in the rotational direction of the second exhaust impeller 12B releases the holding mechanism 44 and releases the front pressure plate 43 and the second drive means 15. The holding mechanism 44 is releasable to enable slow rotation of the second exhaust impeller 12B under the action of the first constant force spring 24. The second intake impeller 26B is coupled to the second exhaust impeller 12B and rotates therewith. It will be understood that the first torsion spring 27 is operable also to rotate the second intake impeller 26B.

The installation of the fan apparatus 1 comprises forming a mounting aperture for receiving the mounting sleeve SL. The mounting aperture may, for example, during construction of a building. The mounting sleeve SL is fixedly mounted in the mounting aperture ready for receiving the cartridge 7. The cartridge 7 is then inserted into the mounting sleeve SL by sliding along the longitudinal axis X-X. The first and second releasable connectors C1, C2 are connected to the hot water system 3; and the third and fourth connectors C3, C4 are connected to the cold water system 4. One or more mechanical fasteners may releasably retain the cartridge 7 in position. The mechanical fastener(s) may, for example, comprise one or more locking tab or screws. It will be understood that the cartridge 7 may be removed from the mounting sleeve SL, for example to facilitate maintenance or repair. When the cartridge 7 is fixed in position within the mounting sleeve SL, the fan apparatus 1 is then ready for use. The operation of the fan apparatus 1 will now be described with reference to the accompanying figures.

The cold water system 4 supplies cold water as a working liquid to the first drive means 14 in order to drive the first exhaust impeller 12A via the first gear set 23. The rotation of the first exhaust impeller 12A causes rotation of the first intake impeller 26A which in turn rotates the second intake impeller 26B via the first torsion spring 27. The effect of the first torsion spring 27 is to turn the second intake impeller 26B in a snatching movement. When the second intake impeller 26B engages, the heating control valve 34 opens and hot water is supplied to the heating unit 30 such that the air drawn through the intake duct 11 is heated as it passes over the heat exchange fins. Thus, the second flow of air FL2 is heated before being expelled through the intake nozzle 45. The rotation of the first drive shaft 13A by the first drive means 14 re-winds the first constant force spring 24 which, once loaded, is primed ready for release.

When the supply of cold water to the first drive means 14 stops, the first constant force spring 24 releases the drives the second drive shaft 13B. The second decoupling means 17 opens to decouple the first and second drive shafts 13A, 13B. The opening of the second decoupling means 17 allows the second exhaust impeller 12B to rotate freely. At the same time as decoupling, the second drive shaft 13B rotates the second drive means 15 and starts to wind up the first constant force spring 24. When the first constant force spring 24 is fully wound and compressed, the second drive means 15 decouples from the second drive shaft 13B and the holding mechanism 44 is locked into a set position, for example by means of a pin and ratchet which move out of position when the second intake impeller 26B turns back on itself. The second exhaust impeller 12B is free-running on the second drive shaft 13B and is driven by the second intake impeller 26B. There is an overrun on the second intake impeller 26B from recoil on the first torsion spring 27 when the first drive means 14 stops. The second exhaust impeller 12B rotates in the opposite direction during overrun and the second drive means 15 activates a ratchet pin mechanism which releases the constant force spring 24. The reversal in the rotational direction of the second intake impeller 26B activates the second drive means 15 to decouple the holding mechanism 44 and initiates a slow release of the first constant force spring 24 which rotates the second drive shaft 13B into the second drive means 15 which drives the second exhaust impeller 12B. The first constant force spring 24 releases the stored energy by rotating the second drive shaft 13B and driving the second intake impeller 26B via the second gear set 41. It will be understood that the first constant force spring 24 reverses the rotational direction of the second drive shaft 13B when it releases. The second gear set 41 may be configured to maintain rotation of the second intake impeller 26B in the same direction irrespective of the rotational direction of the second drive shaft 13B, for example by engaging one or more different gears in dependence on the rotational direction of the second drive shaft 13B. The third exhaust impeller 12C is connected to the first exhaust impeller 12A via the first intake impeller 26A and the second torsion spring 28.

The second drive means control valve 35 opens and closes to boost recoil on the first and second torsion springs 27, 28 which link the first and second intake impellers 26A, 26B. The second drive means control valve 35 is spring-loaded to create an oscillating movement, such that the second drive means control valve 35 repeatedly opens and closes, thereby providing an intermittent supply of liquid to the second drive means 15. The resulting snatching movement on the first and second torsion springs 27, 28 results in a non-uniform rotational speed of the first and third exhaust impellers 12A, 12C and establishes an oscillating effect as their rotational speeds vary. This oscillating effect repeatedly opens and closes the heating control valve 34, thereby prolonging the oscillation effect in during overrun of the fan apparatus 1. The induced variations in the rotational speeds of one or more of the first, second and third exhaust impellers 12A-C and/or one or more of the first and second intake impellers 26A, 26B results in variations in the flow rate through the intake duct 11 and the exhaust duct 10.

When the energy stored in the first constant force spring 24 is depleted, the second drive means control valve 35 continues to open and close for a period of time. A trigger mechanism on the first constant force spring 24 closes the second drive means control valve 35 and disconnects the second drive means 15 from the hot water system 3, thereby completing the overrun function. The supply of cold water from the cold water system 4 causes the first and second decoupling means 16, 17 to close, thereby re-starting the first, second and third exhaust impellers 16A-C and the first and second intake impellers 26A, 26B.

At least in certain embodiments the fan apparatus 1 is operable to extract air from a room through the exhaust duct 10 whilst simultaneously introducing air through the intake duct 11 to ventilate the room. Thus, the fan apparatus 1 provides bidirectional flow. The fan apparatus 1 can be exclusively driven by working liquid from one or more supplies. In the embodiment described herein, the fan apparatus 1 is driven by hot and cold water supplied by respective hot and cold water systems 3, 4. In an alternate arrangement, the same water supply may be used to drive both the exhaust fan 8 and the intake fan 9. In order to facilitate installation and servicing of the fan apparatus 1, the connectors C1-4 may be quick release valves. The exhaust fan 8 and the intake fan 9 are disposed in a removable fan cartridge for ease of maintenance and/or replacement, if required.

Figure 5:
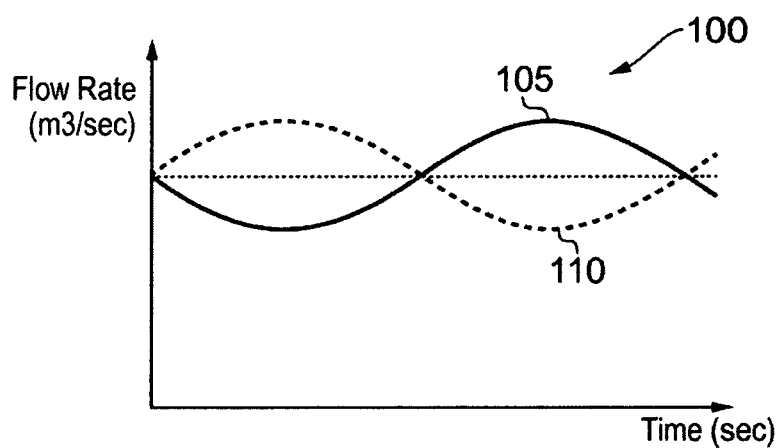
FIG. 5 illustrates the flow rate of air through the intake duct and the exhaust duct of the fan apparatus shown in FIG. 1.

At least in certain embodiments the fan apparatus 1 described herein may provide pulsed (non-uniform) operation of the exhaust fan 8 and the intake fan 9. It is believed that at least in certain embodiments the non-uniform operation of the exhaust fan 8 and the intake fan 9 may help to reduce the noise, vibration and harshness (NVH) characteristics of the fan apparatus 1. The operating speed of the exhaust fan 8 and the intake fan 9 increase and decrease with respect to time. At least in certain embodiments the first and second torsion springs 27, 28 may introduce a temporal offset of the pulses of the exhaust fan 8 and the intake fan 9. For example, the operating speed of the exhaust fan 8 may be at a maximum when the operating speed of the intake fan 9 is at a minimum and vice versa. This operating mode is illustrated in a first graph 100 shown in FIG. 5 representing the flow rate through the fan apparatus 1. A first plot 105 represents an intake flow rate through the intake duct 11; and a second plot 110 represents an exhaust flow rate through the exhaust duct 10. In the arrangement illustrated in FIG. 5, the variations in the flow rate through the intake duct 11 and the exhaust duct 10 are out of phase with each other. This control strategy is believed to be patentable independently of the other concepts described herein. It will be understood that this control strategy could be implemented by a fan apparatus comprising an electronic control unit configured to control a rotational speed of first and second electric motors for rotating intake and exhaust impellers respectively.

Figure 6:
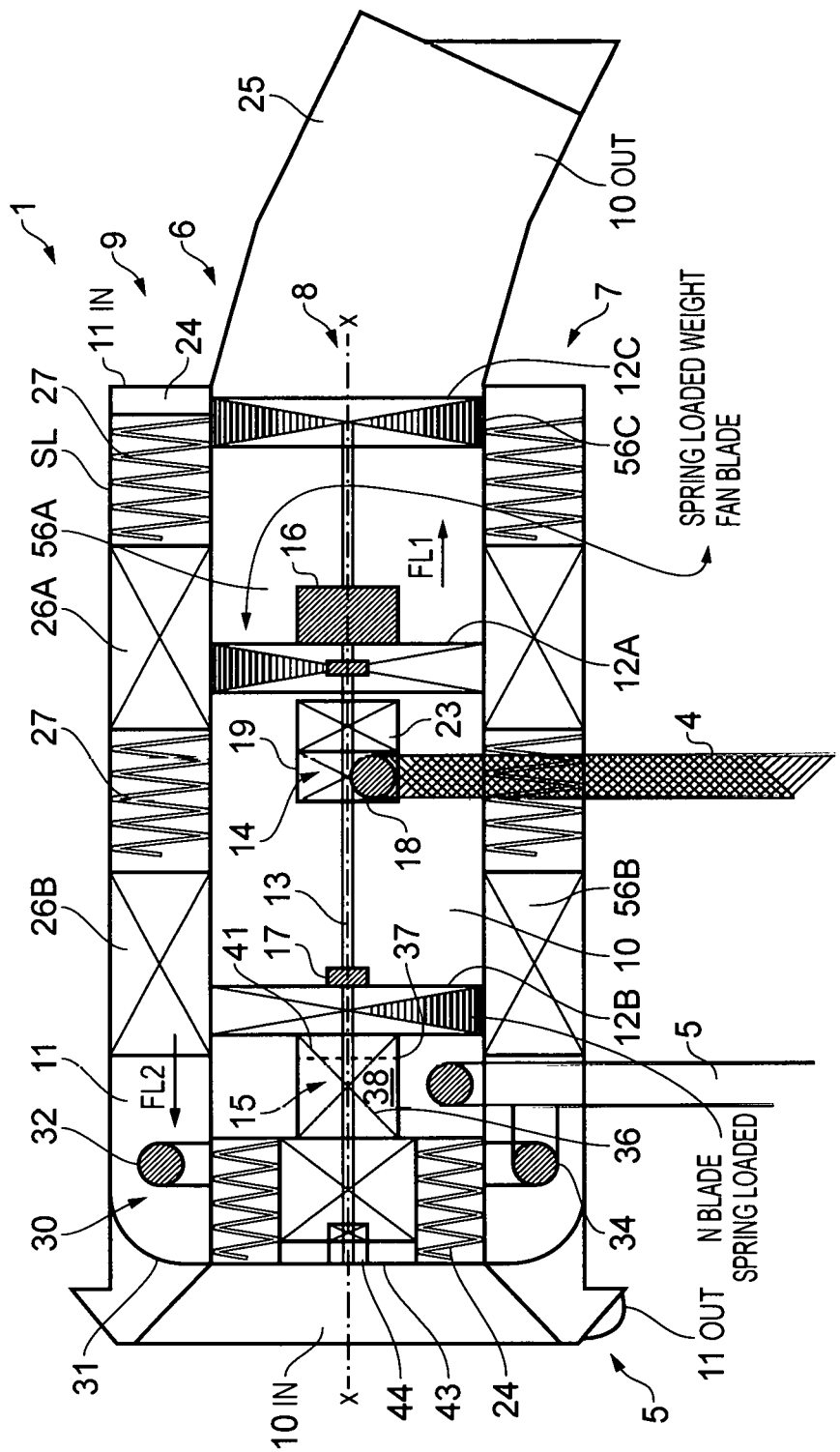
FIG. 6 shows a schematic representation of a fan apparatus according to a further embodiment of the present invention.
Figure 7:
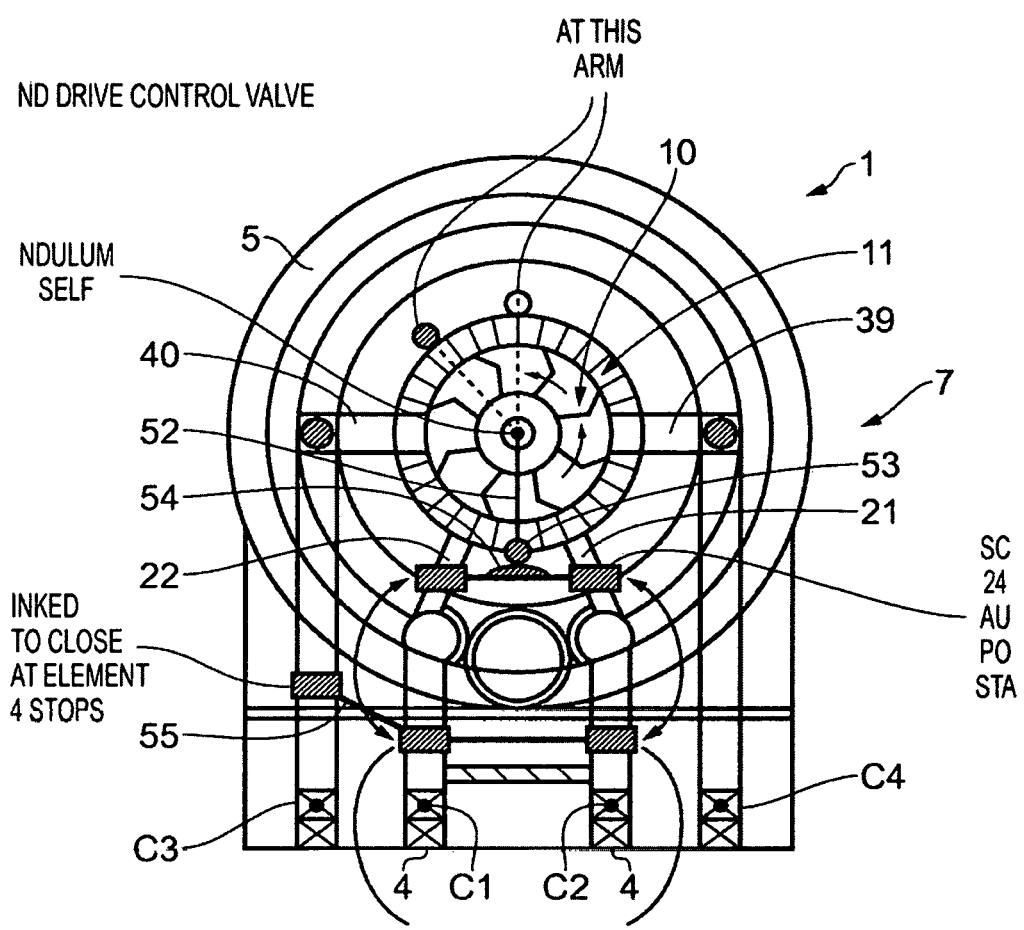
FIG. 7 is a front elevation of the fan apparatus shown in FIG. 6.

A modified embodiment of the fan apparatus 1 will now be described with reference to FIGS. 6 and 7. The fan apparatus 1 is a development of the embodiment described herein with reference to FIGS. 1 to 4. Like reference numerals are used for like components.

The fan apparatus 1 comprises a second drive means control valve 35 which is cyclically opened and closed to boost recoil on the first and second torsion springs 27, 28. In the present embodiment the fan apparatus 1 comprises an actuating arm 52 for actuating the second drive means control valve 35. The actuating arm 52 is rotatably mounted to the second drive shaft 12B and is arranged to rotate about the longitudinal axis X of the fan apparatus 1. A first mass 53 is supported at a radially outer end of the actuating arm 52. The actuating arm 52 is rotated by the first constant force spring 24 as the first constant force spring 24 releases energy as part of the overrun function of the fan apparatus 1. The rotation of the actuating arm 52 cycles the second drive means control valve 35 between open and closed states. The actuating arm 52 may cooperate with actuating means, such as a spring loaded compression (skid) plate 54, to open/close the second drive means control valve 35. The actuating arm 52 travels downwardly and contacts the spring loaded compression plate 54. The spring loaded compression plate 54 is displaced by the actuating arm 52 causing the second drive means control valve 35 to open and supply hot water from the hot water system 3 to the second turbine 36. Once the actuating arm 52 passes, the spring-biased action of the spring loaded compression plate 54 closes the second drive means control valve 35. This is repeated as the pendulum repeatedly turns until the first constant force spring 24 is primed again. This action is constantly repeated by the actuating arm 52 until the energy stored in the first constant force spring 24 is depleted (i.e. when the overrun function is complete). With reference to FIG. 7, the actuating arm 52 changes the state of the second drive means control valve 35 each time it is disposed substantially vertically downwardly (at a 6 o'clock position). The actuating arm 52 and the second drive means control valve 35 can be configured such that actuation occurs at different angular positions. The action of the actuating arm 52 may decouple the first exhaust impeller 12A from the second drive means 15 during overrun, thereby allowing the first exhaust impeller 12A to rotate freely on the second drive shaft 12B. The actuating arm 52 may be in the form of a pendulum.

A further modification to the fan apparatus 1 relates to the means for actuating the heating control valve 34. The heating control valve 34 is configured to be actuated in dependence on the supply of the working liquid from the cold water system 4. In particular, the heating control valve 34 is configured to open when the supply of working liquid from the cold water system 4 stops. The heating control valve 34 thereby opens to supply hot water to the heating unit 30 when the supply of water to the first drive means 14 stops. Thus, hot water is supplied to the heating unit 30, causing air drawn through the intake duct 11 to be heated as it passes over the heat exchange fins. The connection between the cold water system 4 and the heating control valve 34 is illustrated in FIG. 7 by a control passage 55 extending between the return conduits from the first and second drive means 14, 15. In a further variant, the heating control valve 34 may be actuated by an electromechanical actuator, such as a solenoid.

A further modification relates to the configuration of the first, second and third exhaust impellers 12A, 12B, 12C. As illustrated in FIG. 6, first, second and third active masses 56A, 56B, 56C are disposed on the first, second and third exhaust impellers 12A, 12B, 12C respectively. The first, second and third active masses 56A, 56B, 56C may be angularly offset from each other, for example to aid oscillation of the first, second and third exhaust impellers 12A, 12B, 12C. One or more of the first, second and third active masses 56A, 56B, 56C may be movably mounted and may be spring-biased radially inwardly. In this arrangement, centrifugal forces resulting from the rotation of the first, second and third exhaust impellers 12A, 12B, 12C may overcome the respective spring biases and the first, second and third active masses 56A, 56B, 56C may be displaced radially outwardly. The first, second and third active masses 56A, 56B, 56C may store energy for release during overrun when the supply of working liquid is inhibited. The first, second and third active masses 56A, 56B, 56C may each comprise one or more masses which may be balanced or unbalanced.

A fan apparatus 1 in accordance with a further embodiment of the present invention will now be described with reference to FIGS. 8 and 9. The description herein will focus on the differences over the previous embodiment of the fan apparatus 1. Like reference numerals are used for like components.

The fan apparatus 1 comprises an exhaust fan 8 associated with an exhaust duct 10; and an intake fan 9 associated with an intake duct 11. The exhaust fan 8 is configured to generate a first flow of air FL1 through the exhaust duct 10 and the intake fan 9 is configured to generate a second flow of air FL2 through the intake duct 11. The exhaust fan 8 comprises first, second and third exhaust impellers 12A-C disposed in the exhaust duct 10 and rotatable about a longitudinal axis X-X of the fan apparatus 1. The intake fan 9 comprises first and second intake impellers 26A, 26B disposed in the intake duct 11 and rotatable about the longitudinal axis X-X. The fan apparatus 1 comprises a first drive shaft (spline) 13A, a second drive shaft (spline) 13B, a first drive means 14, a second drive means 15, a first decoupling means 16 and a second decoupling means 17. The second drive means 15 comprises a first energy storage means 24 which is in the form of a first constant force spring 24 in the present embodiment. First and second torque transfer means 27, 28 are associated with the first and second intake impellers 26A, 26B. In the present embodiment, the first and second torque transfer means 27, 28 are in the form of first and second torsion springs 27, 28.

The fan apparatus 1 in the present embodiment also comprises an electric motor 47, a moisture sensor 48, a power supply 49 and an electrical connector 50. The fan apparatus 1 may optionally also comprise a third decoupling means 51, for example in the form of a third clutch, for selectively coupling and decoupling the electric motor 47 from the first drive shaft 13A. The electric motor 47 is provided as a back-up device for the first drive means 14 and is operable to rotate the first exhaust impeller 12A. The third decoupling means 51 comprises a third clutch which closes to couple the electric motor 47 to the first drive shaft 13A. In use, it is envisaged that the first and second decoupling means 16, 17 are configured to open when the electric motor 47 is energized and the third decoupling means 51 closes drivingly to connect the electric motor 47 to the first drive shaft 13A. When working liquid is supplied to the first drive means 14, the first and second decoupling means 16, 17 close and the third decoupling means 51 opens.

The electric motor 47 may optionally be controlled in dependence on the moisture sensor 48. In particular, the electric motor 47 is energized to drive the first exhaust impeller 12A when the moisture sensor 48 detects moisture. It will be understood that the electric motor 47 operates the exhaust fan 8 and the intake fan 9 in substantially the same manner as the first drive means 14 described herein. In particular, the electric motor 47 transmits torque to the first exhaust impeller 12A which drives the first and second intake impellers 26A, 26B and the second and third exhaust impellers 12B, 12C. In the present embodiment the electric motor 47 does not provide an overrun function, but it will be understood that a time delay function could be implemented. Alternatively, or in addition, a switch or other control means may be provided for controlling operation of the electric motor 47.

The fan apparatus 1 utilises the arrangement described herein of a removable cartridge 7 mounted in a mounting sleeve SL. In the present embodiment, the electric motor 47 is mounted in the cartridge 7. The electrical connector 50 is provided to connect the electric motor 47 to the power supply 49. The electrical connector 50 may be any suitable power connector.

Figure 8:
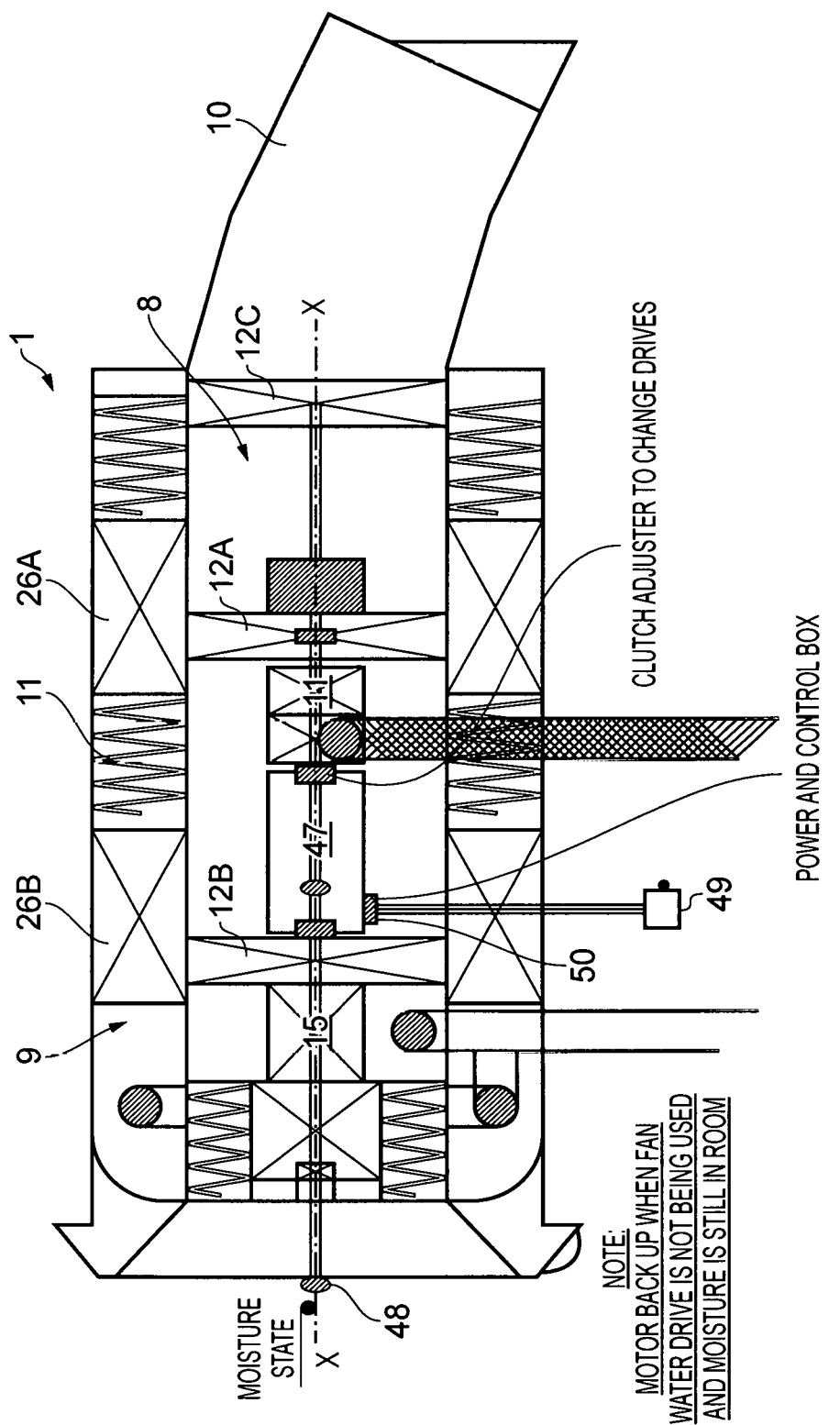
FIG. 8 is a schematic representation of a hybrid fan apparatus according to a further embodiment of the present invention.
Figure 10:
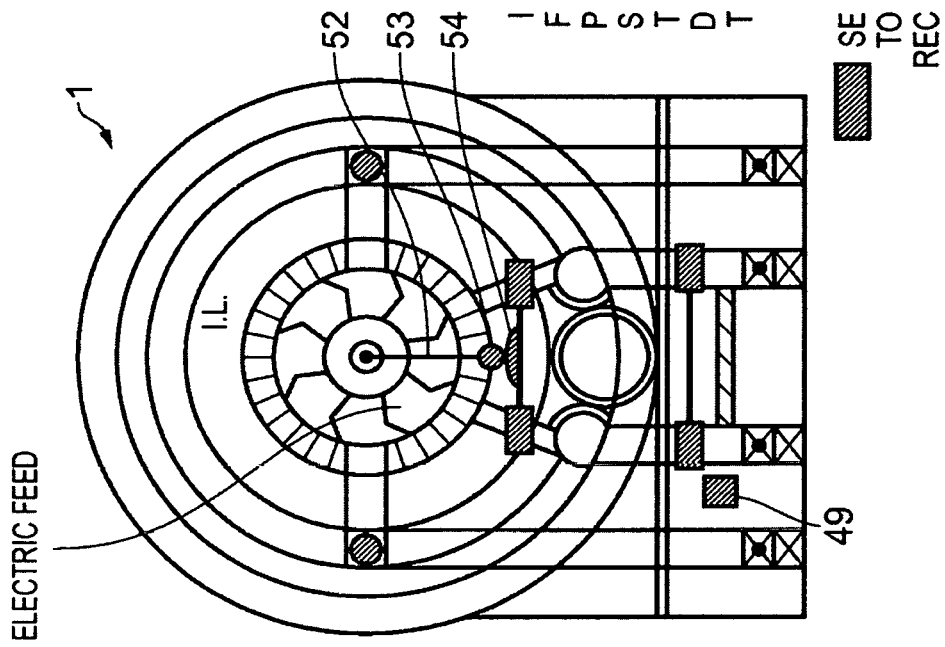
FIG. 10 shows a variant of the fan apparatus shown in FIGS. 8 and 9.
Figure 9:
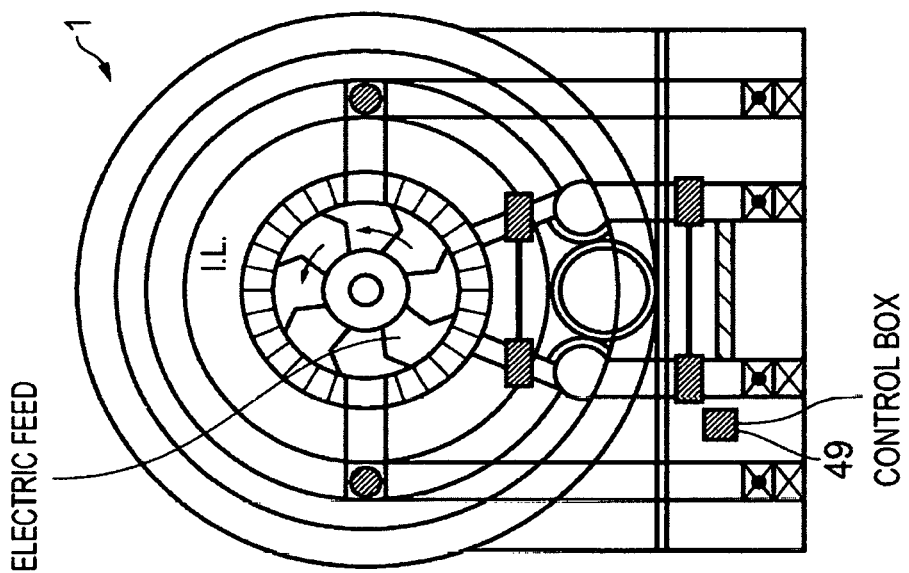
FIG. 9 shows a front elevation of the fan apparatus shown in FIG. 8.

A further variant of the fan apparatus 1 shown in FIGS. 8 and 9 is illustrated in FIG. 10. This variant incorporates the actuating arm 52 illustrated in FIG. 7 to actuate the second drive means control valve 35. The actuating arm 52 is rotatably mounted to the second drive shaft 12B and is arranged to rotate about the longitudinal axis X of the fan apparatus 1. The actuating arm 52 may cooperate with actuating means, such as a skid plate 54, to open/close the second drive means control valve 35. A first mass 53 is supported at a radially outer end of the actuating arm 52. The actuating arm 52 is rotated by the first constant force spring 24 as the first constant force spring 24 releases energy as part of the overrun function of the fan apparatus 1. The rotation of the actuating arm 52 cycles the second drive means control valve 35 between open and closed states.

It will be appreciated that various modifications may be made to the embodiment(s) described herein without departing from the scope of the appended claims. The exhaust fan 8 and the intake fan 9 may be configured to rotate in the same direction or in opposite directions. The first coupling mechanism for coupling the first intake impeller 26A and the first exhaust impeller 12A may comprise one or more gears to control the relative rotational directions. Similarly, the second coupling mechanism for coupling the second intake impeller 26B to the third exhaust impeller 12C may also comprise one or more gears to control the relative rotational directions.

The fan apparatus 1 described herein may be configured to be connected to a pressurised water supply. The hot water system 3 and/or the cold water system 4 described herein may have an operating pressure greater than or equal to (≥)1 bar, 1.5 bar, 2 bar, 2.5 bar, 3 bar or 3.5 bar. It will be understood that the fan apparatus 1 may be configured to operate with water supplies (either hot or cold) having higher or lower operating pressures. In certain embodiments, the fan apparatus 1 may be configurable in dependence on an operating pressure of the working liquid. The one or more energy storage means may be adjustable for operation with working liquid at a particular operating pressure or in a particular range of operating pressures. For example, in arrangements in which the energy storage means comprises at least one spring, the tension in the or each spring may be adjustable. Alternatively, or in addition, the one or more energy storage means may be replaceable to facilitate installation of an energy storage means matched to a particular set of operating conditions.

The water supply may, for example, have a flow rate of greater than or equal to ($\geq$)0.25 litres/sec, 0.5 litres/sec, 0.75 litres/sec, 1 litres/sec, 1.25 litres/sec or 1.5 litres/sec. In certain embodiments, the fan apparatus 1 may be configurable in dependence on the flow rate of the working liquid. The configuration of the turbine may be adjustable in dependence on the flow rate of the working liquid. For example, the angular orientation of the blades of the turbine may be adjustable. Alternatively, or in addition, the turbine may be replaceable to facilitate installation of a turbine matched to a particular set of operating conditions.

The invention claimed is:

1. A fan apparatus, comprising:
   an exhaust duct having an exhaust inlet and an exhaust outlet;
   an intake duct having an intake inlet and an intake outlet;
   a first impeller for generating a first flow of air in a first direction;
   a drive means for driving the first impeller;
   wherein the drive means comprises a turbine adapted to be rotated by a working liquid supplied to the fan apparatus; and
   wherein the fan apparatus comprises a second impeller for generating a second flow of air in a second direction, the first and second directions being opposite to each other;
   wherein the first impeller is one of an exhaust impeller and an intake impeller; and the second impeller is the other one of the exhaust impeller and the intake impeller;
   the exhaust impeller being configured to generate the first flow of air in the first direction through the exhaust duct; and
   the intake impeller being configured to generate the second flow of air in the second direction through the intake duct.

2. The fan apparatus according to claim 1, comprising a supply conduit for supplying working liquid to the turbine, wherein the supply conduit is configured to be connected to a water supply for supplying water as the working liquid.

3. The fan apparatus according to claim 2, wherein the supply conduit comprises an inlet and an outlet for connection in series to said water supply, the turbine being disposed between the inlet and the outlet of the supply conduit.

4. The fan apparatus according to claim 2, wherein the supply conduit is configured to be connected to a mains water supply.

5. The fan apparatus according to claim 1, comprising a heating unit disposed upstream or downstream of the impeller for heating the air.

6. The fan apparatus according to claim 5, wherein the heating unit comprises one or more heat exchange fins for heating the flow of air.

7. The fan apparatus according to claim 5, wherein the heating unit is thermally coupled to a hot water conduit for connection to a hot water supply.

8. The fan apparatus according to claim 7, wherein the hot water conduit is configured to be connected to a hot water loop.

9. The fan apparatus according to claim 1, comprising one or more energy storage means for storing energy supplied by the working liquid and for rotating the impeller when the supply of working liquid decreases or stops, wherein the energy storage means comprises spring means.

10. The fan apparatus according to claim 9, wherein the spring means comprises one or more spring elements, wherein the one or more spring elements include one or more constant force springs.

11. The fan apparatus according to claim 9, wherein the energy storage means is configured to vary a rotational speed of the impeller.

12. The fan apparatus according to claim 9, comprising a clutch for decoupling the drive means when the energy storage means reaches a predetermined charge state.

13. The fan apparatus according to claim 12, comprising a drive shaft or a gear train for selectively coupling the energy storage means to the impeller.

14. The fan apparatus according to claim 1, comprising second drive means for driving the second impeller, wherein the second drive means comprises a second turbine adapted to be rotated by a working liquid supplied to the fan apparatus.

15. The fan apparatus according to claim 1, wherein the first and second impellers are arranged concentrically.

16. The fan apparatus according to claim 1, wherein the fan apparatus is an extractor fan and/or a ventilation fan.

17. The fan apparatus according to claim 1, wherein the impeller and the drive means are disposed in a removable cartridge.

18. The fan apparatus according to claim 1, wherein the drive means is configured to drive the first and second impellers.

19. The fan apparatus according to claim 15, wherein one of said first and second impellers has an annular configuration and the other of said first and second impellers has a circulate configuration.

20. The fan apparatus according to claim 15, wherein the exhaust duct and the intake duct are arranged concentrically.

* * * * *